US012672184B2

(12) United States Patent
Shafin et al.

(10) Patent No.: US 12,672,184 B2
(45) Date of Patent: Jun. 30, 2026

(54) TDLS DISCOVERY AND SETUP FOR MULTI-LINK OPERATION

(71) Applicant: Samsung Electronics Co., Ltd., Suwon-si (KR)

(72) Inventors: Rubayet Shafin, Allen, TX (US); Boon Loong Ng, Plano, TX (US); Vishnu Vardhan Ratnam, Plano, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 18/342,651

(22) Filed: Jun. 27, 2023

(65) Prior Publication Data

US 2024/0015823 A1     Jan. 11, 2024

Related U.S. Application Data

(60) Provisional application No. 63/359,153, filed on Jul. 7, 2022.

(51) Int. Cl.
*H04W 76/14* (2018.01)
*H04W 8/00* (2009.01)
(Continued)

(52) U.S. Cl.
CPC ........... *H04W 76/14* (2018.02); *H04W 8/005* (2013.01)

(58) Field of Classification Search
CPC ..... H04W 76/14; H04W 8/005; H04W 76/12; H04W 76/15; H04W 84/12
See application file for complete search history.

(56) References Cited

U.S. PATENT DOCUMENTS

2022/0124856 A1* 4/2022 Patil ..................... H04W 76/14
2022/0124857 A1   4/2022 Patil et al.
(Continued)

FOREIGN PATENT DOCUMENTS

CN           113973400 A     1/2022
KR   10-2022-0029395 A     3/2022
(Continued)

OTHER PUBLICATIONS

International Search Report and Written Opinion issued Oct. 12, 2023 regarding International Application No. PCT/KR2023/009555, 8 pages.
(Continued)

*Primary Examiner* — Harry H Kim

(57) ABSTRACT

Methods and apparatuses for facilitating the discovery and setup of multiple peer-to-peer (P2P) direct links for P2P communications between peer multi-link devices (MLDs). A first non-access point (AP) MLD comprises first stations (STAs), each comprising a transceiver configured to form a link with a corresponding AP of an AP MLD, and a processor. The processor is configured to generate a first message that includes information indicating that one or more of the links are target links on which the first non-AP MLD intends to establish a P2P direct link with second STAs of a second non-AP MLD, wherein the second STAs are associated with the corresponding AP of the AP MLD on the target links. The transceiver of a first of the first STAs is further configured to transmit the first message to the corresponding AP of the AP MLD over the link.

20 Claims, 10 Drawing Sheets

(51) Int. Cl.

| | | |
|---|---|---|
| *H04W 76/12* | (2018.01) | |
| *H04W 76/15* | (2018.01) | |
| *H04W 84/12* | (2009.01) | |

(56) References Cited

U.S. PATENT DOCUMENTS

| | | | | |
|---|---|---|---|---|
| 2022/0174768 | A1* | 6/2022 | Kim | H04L 5/0048 |
| 2022/0182184 | A1* | 6/2022 | Wang | H04L 1/1621 |
| 2022/0201785 | A1* | 6/2022 | Kneckt | H04W 12/03 |
| 2023/0180323 | A1 | 6/2023 | Sang et al. | |
| 2023/0247666 | A1* | 8/2023 | Kim | H04W 74/0808 |
| 2024/0040639 | A1* | 2/2024 | Chitrakar | H04W 76/12 |

FOREIGN PATENT DOCUMENTS

| | | | |
|---|---|---|---|
| WO | 2014152853 | A2 | 9/2014 |
| WO | 2022005165 | A1 | 1/2022 |
| WO | 2022124979 | A1 | 6/2022 |

OTHER PUBLICATIONS

IEEE P802.11be-D2.1 "Part 11: Wireless LAN Medium Access Control (MAC) and Physical Layer (PHY) Specifications, Amendment 8: Enhancements for extremely high throughput (EHT)" Jul. 2022, 885 pages.

IEEE P802.11be-D3.0 "Part 11: Wireless LAN Medium Access Control (MAC) and Physical Layer (PHY) Specifications— Amendment 8: Enhancements for extremely high throughput (EHT)" Jan. 2023, 999 pages.

Extended European Search Report issued Apr. 11, 2025 regarding Application No. 23835854.3, 13 pages.

"35. Extremely high throughput (EHT) MAC specification", IEEE P802.11be/D1.5, Mar. 2022, pp. 369-494.

* cited by examiner

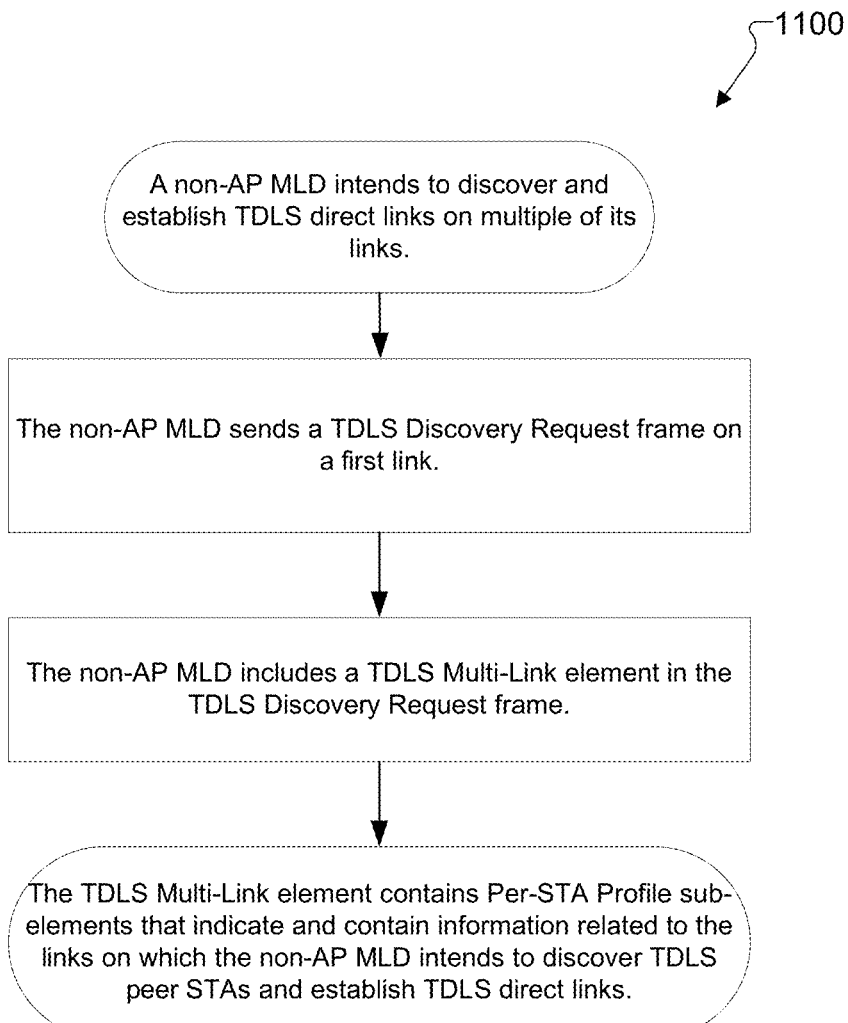

A non-AP MLD intends to discover and establish TDLS direct links on multiple of its links.

The non-AP MLD sends a TDLS Discovery Request frame on a first link.

The non-AP MLD includes a TDLS Multi-Link element in the TDLS Discovery Request frame.

The TDLS Multi-Link element contains Per-STA Profile sub-elements that indicate and contain information related to the links on which the non-AP MLD intends to discover TDLS peer STAs and establish TDLS direct links.

FIG. 11

TDLS DISCOVERY AND SETUP FOR MULTI-LINK OPERATION

CROSS-REFERENCE TO RELATED APPLICATION AND CLAIM OF PRIORITY

This application claims priority under 35 U.S.C. § 119(e) to U.S. Provisional Patent Application No. 63/359,153 filed on Jul. 7, 2022, which is hereby incorporated by reference in its entirety.

TECHNICAL FIELD

This disclosure relates generally to peer-to-peer communication in wireless communications systems that include multi-link devices. Embodiments of this disclosure relate to methods and apparatuses for facilitating the discovery and setup of multiple peer-to-peer direct links for peer-to-peer communications between peer multi-link devices (MLD) in a wireless local area network (WLAN) communications system.

BACKGROUND

WLAN technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aims to increase speed and reliability and to extend the operating range of wireless networks.

Next-generation extremely high throughput (EHT) WI-FI systems, e.g., IEEE 802.11 be, support multiple bands of operation, called links, over which an access point (AP) and a non-AP device can communicate with each other. Thus both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange are possible on each link that is set up between the AP MLD and non-AP MLD. The component of an MLD that is responsible for transmission and reception on one link is referred to as a station (STA).

SUMMARY

Embodiments of the present disclosure provide methods and apparatuses for facilitating the discovery and setup of multiple P2P direct links for P2P communications between peer MLDs in a WLAN.

In one embodiment, a first non-AP MLD is provided. The first non-AP MLD comprises first STAs, each comprising a transceiver configured to form a link with a corresponding AP of an AP MLD, and a processor operably coupled to the first STAs. The processor is configured to generate a first message that includes information indicating that one or more of the links are target links on which the first non-AP MLD intends to establish a P2P direct link with second STAs of a second non-AP MLD, wherein the second STAs are associated with the corresponding AP of the AP MLD on the target links. The transceiver of a first of the first STAs is further configured to transmit the first message to the corresponding AP of the AP MLD over the link.

In another embodiment, a method of wireless communication is provided, performed by a first non-AP MLD that comprises first STAs that each comprise a transceiver configured to form a link with a corresponding AP of an AP MLD. The method includes the steps of generating a first message that includes information indicating that one or more of the links are target links on which the first non-AP MLD intends to establish a P2P direct link with second STAs of a second non-AP MLD, wherein the second STAs are associated with the corresponding AP of the AP MLD on the target links, and transmitting the first message to the corresponding AP of the AP MLD over the link.

In another embodiment, an AP MLD is provided. The AP MLD comprises APs, each comprising a transceiver configured to form a link with a corresponding first STA of a first non-AP MLD and with a corresponding second STA of a second non-AP MLD, and a processor operably coupled to the APs. The transceiver of a first of the APs is further configured to receive, from the corresponding first STA of the first non-AP MLD over the link, a first message that includes information indicating that one or more of the links are target links on which the first non-AP MLD intends to establish a P2P direct link with the second STAs of the second non-AP MLD that are associated with the corresponding AP of the AP MLD on the target links. The processor is configured to determine that the first message is intended for the second non-AP MLD. The transceiver of the first of the APs is further configured to transmit the first message to the corresponding second STA of the second non-AP MLD over the link.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example process for Multiple TDLS discovery for a non-AP MLD.

DETAILED DESCRIPTION

FIG. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that EMLSR operation for P2P communication (for example, tunneled direct link setup (TDLS)) is not defined in current IEEE 802.11be specifications. Accordingly, while a non-AP MLD is communicating with its associated AP MLD and is operating in EMLSR mode, whether or not it is possible for the non-AP MLD to establish one or multiple peer-to-peer links with another peer non-AP MLD is not clear based on the latest IEEE 802.11 be specification. Even if it is possible, there is no defined procedure for P2P setup while operating in the EMLSR mode.

Embodiments of the present disclosure further recognize that if two non-AP MLDs have already set up peer-to-peer links over one or multiple links between the two non-AP MLDs, there is no defined procedure for initiating (or activating) the EMLSR mode for P2P communications between the two non-AP MLDs. The operational procedure for EMLSR for P2P communication is also not defined in the current 802.11 be specification.

Accordingly, embodiments of the present disclosure provide methods and apparatuses to facilitate the discovery and setup of multiple P2P direct links for P2P communications between peer MLDs.

Figure 1:
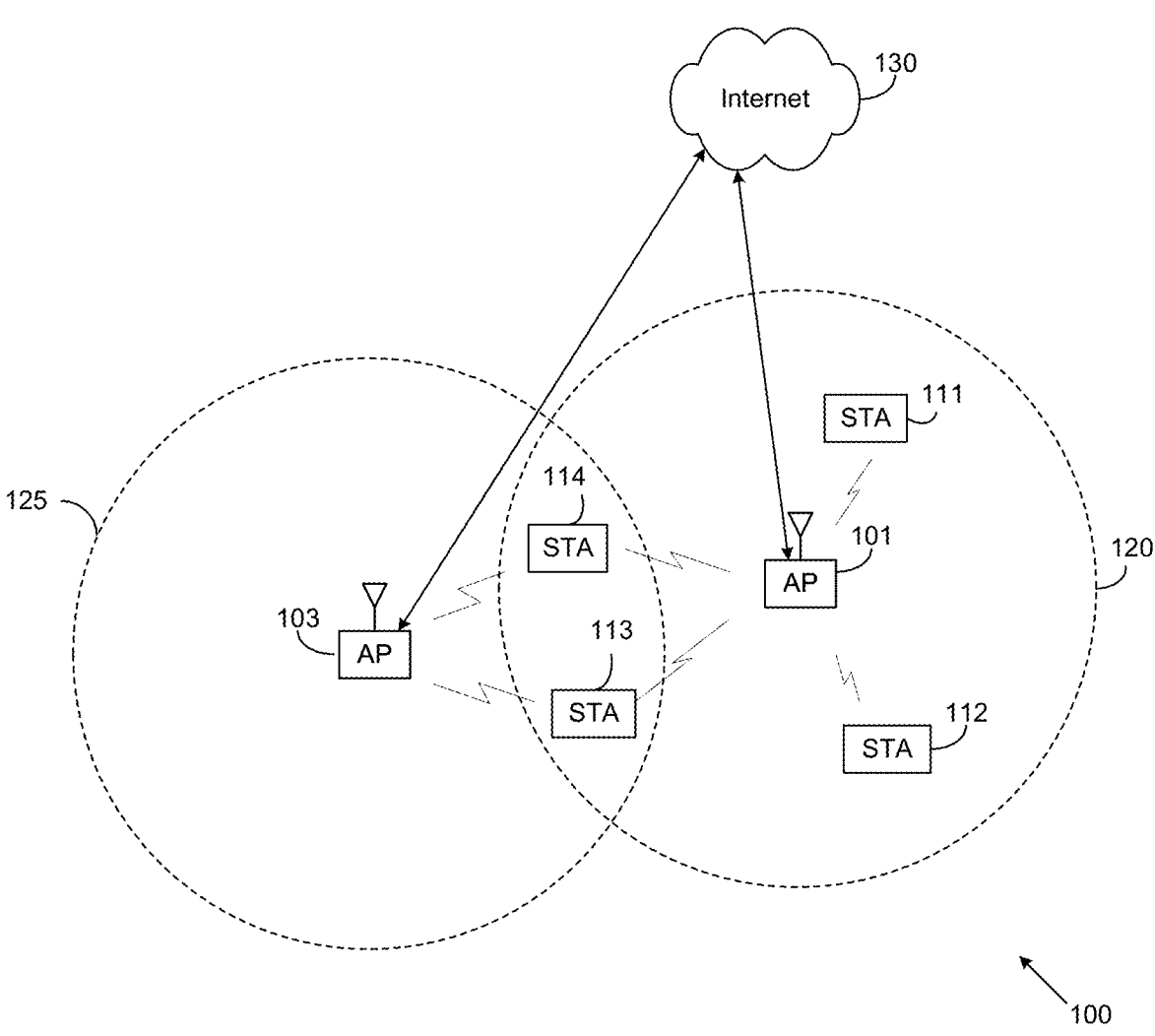
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station,"

"remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the discovery and setup of multiple P2P direct links for P2P communications between peer MLDs in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
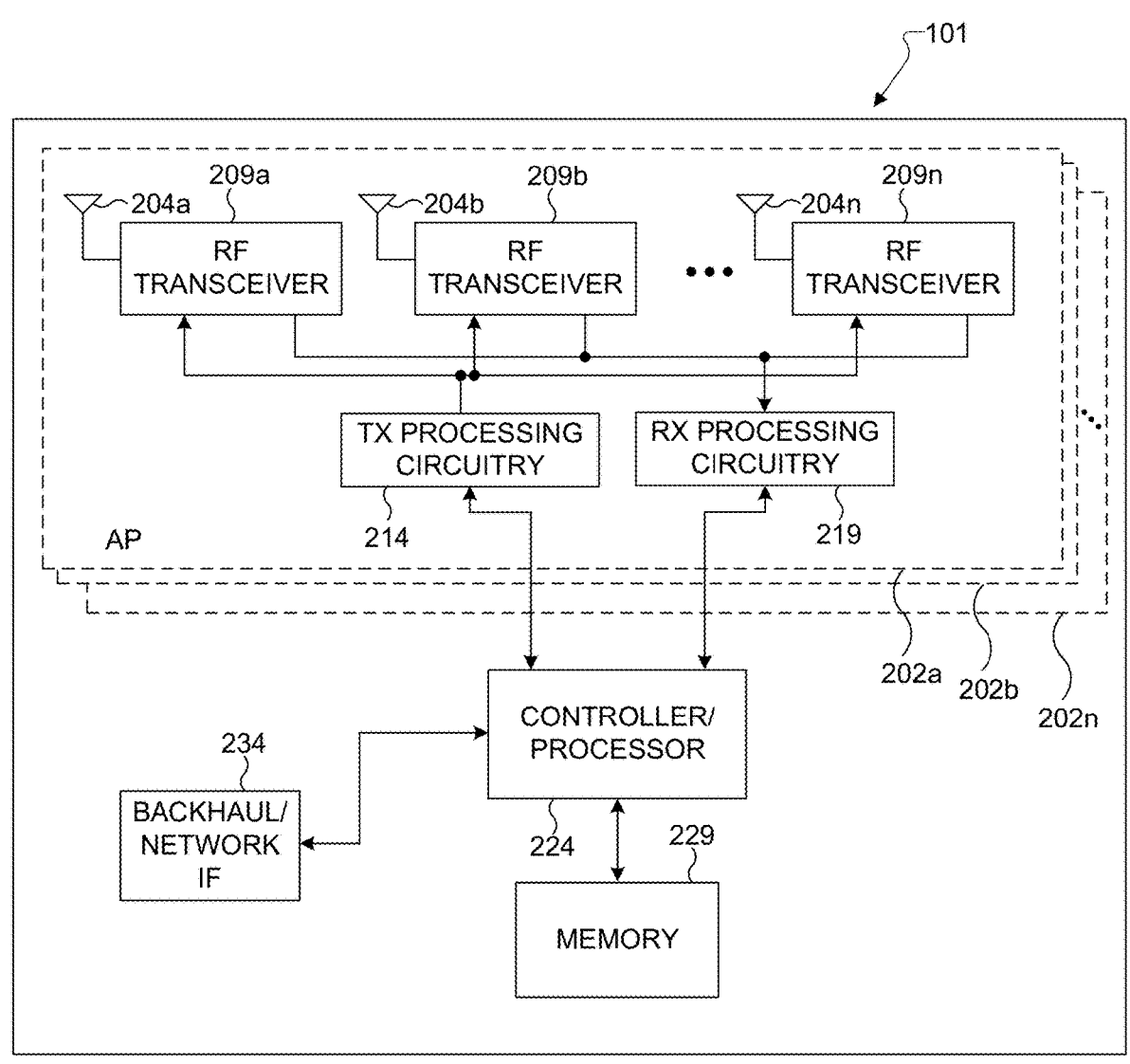
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the discovery and setup of multiple P2P direct links for P2P communications between peer MLDs in a WLAN. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the discovery and setup of multiple P2P direct links for P2P communications between peer MLDs in a WLAN. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
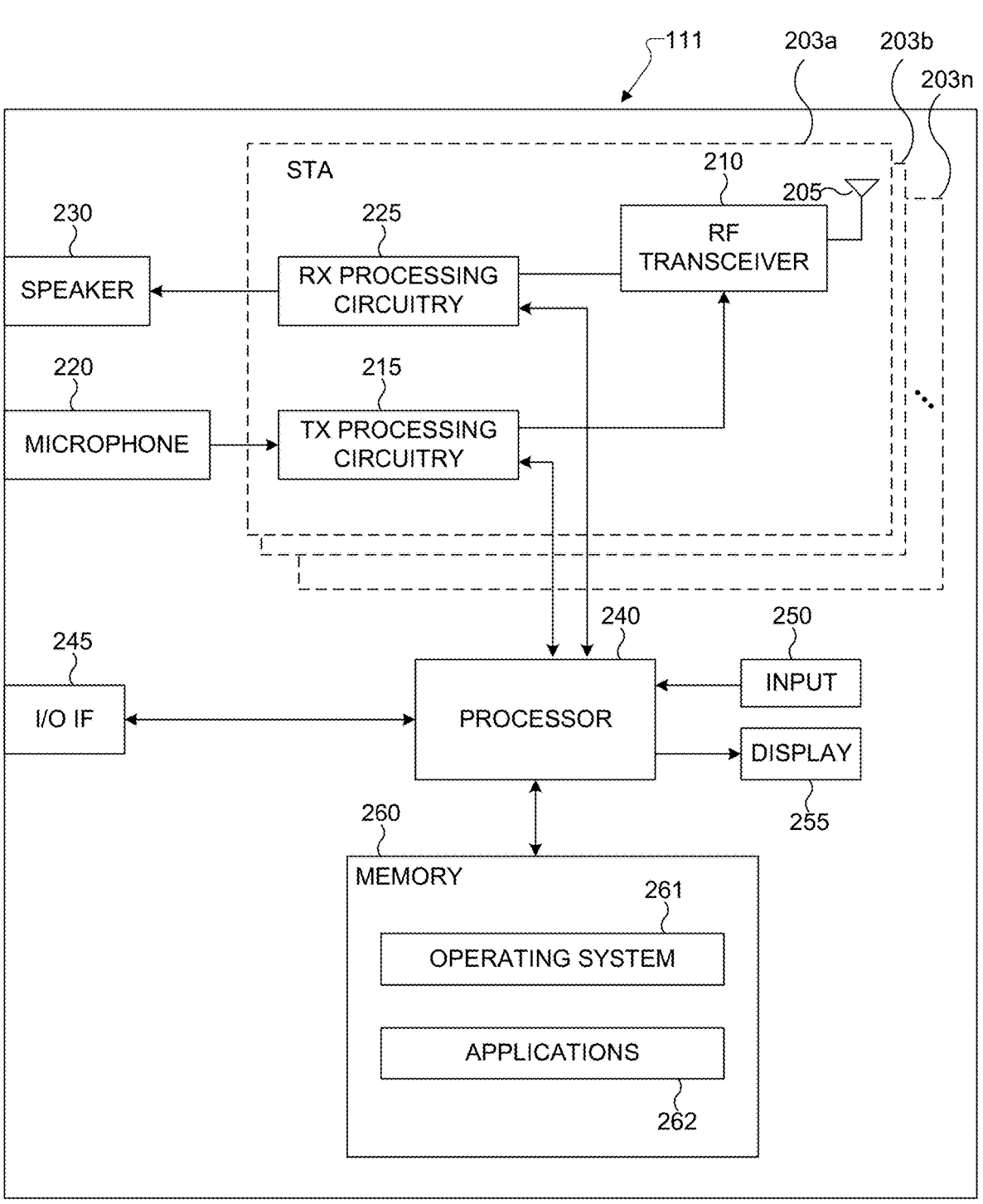
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the discovery and setup of multiple P2P direct links for P2P communications between peer MLDs in a WLAN. In some embodiments, the controller/processor 240 includes at least one microprocessor or microcontroller.

The controller/processor 240 is also capable of executing other processes and programs resident in the memory 260, such as operations for facilitating the discovery and setup of multiple P2P direct links for P2P communications between peer MLDs in a WLAN. The controller/processor 240 can move data into or out of the memory 260 as required by an executing process. In some embodiments, the controller/processor 240 is configured to execute a plurality of applications 262, such as applications for facilitating the discovery and setup of multiple P2P direct links for P2P communications between peer MLDs in a WLAN. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
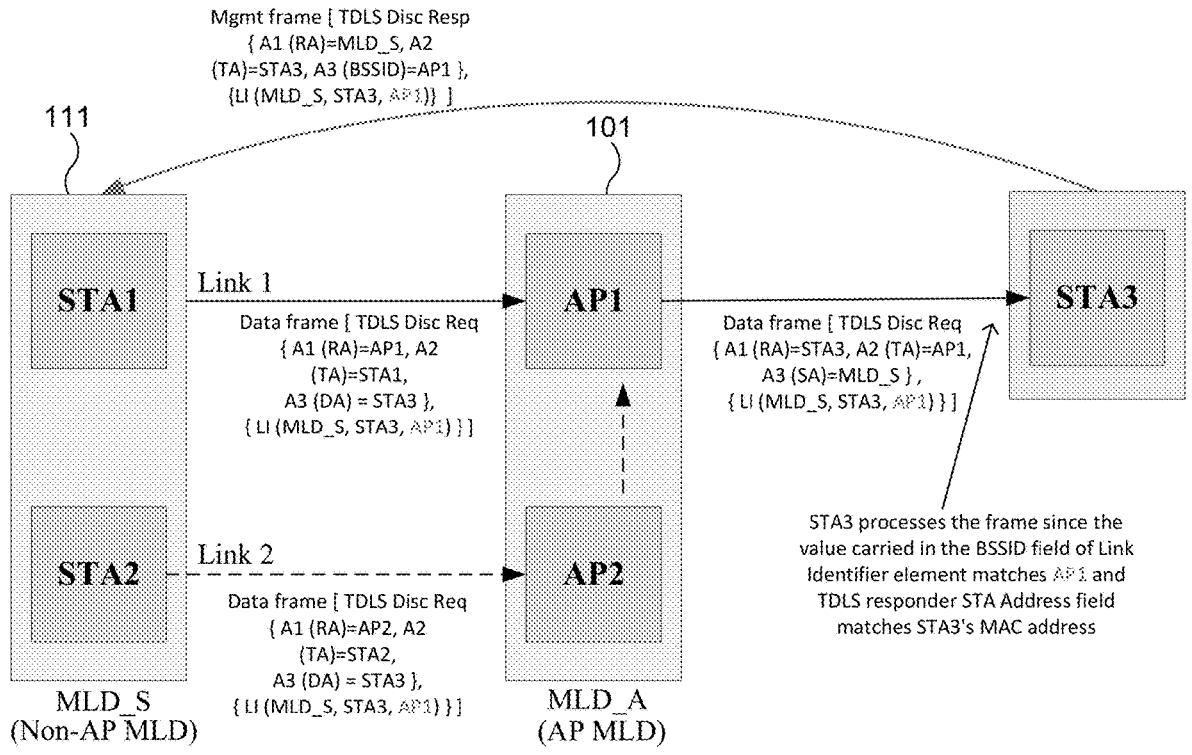
FIGS. 3 and 4 illustrate an example process for discovery of a single TDLS peer STA according to embodiments of the present disclosure.
Figure 4:
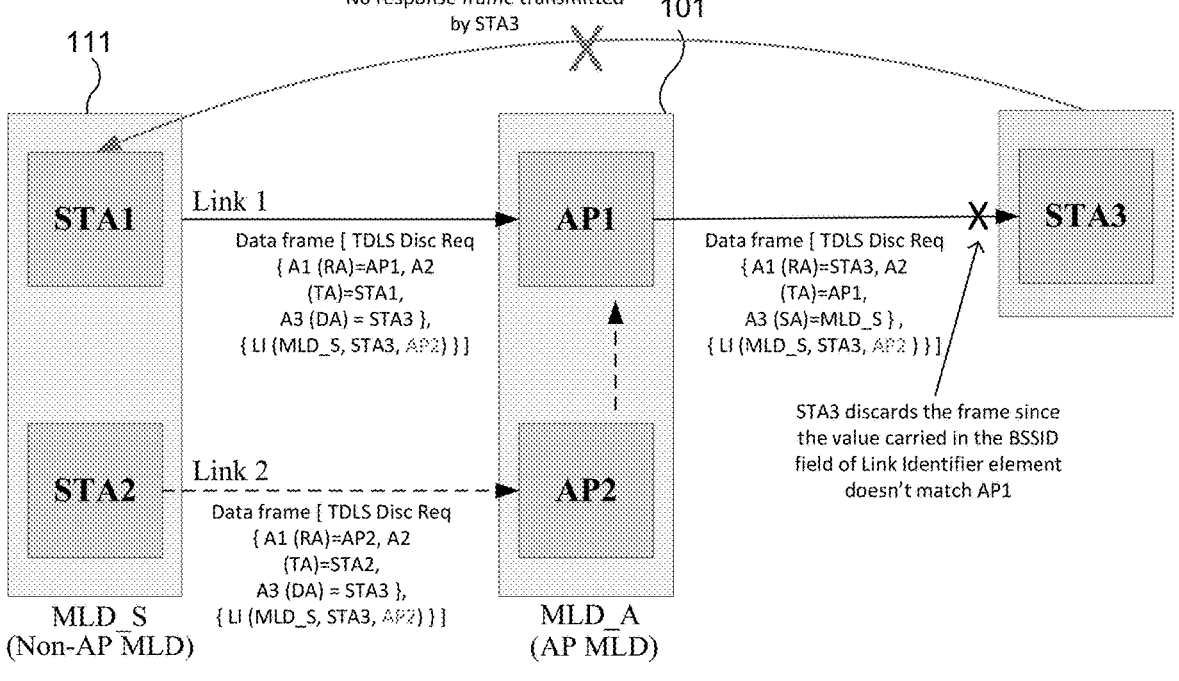

FIGS. 3 and 4 illustrate an example process for discovery of a single tunneled direct link setup (TDLS) peer STA according to embodiments of the present disclosure. In this example, the AP MLD (MLD_A) may be an AP MLD 101, and the non-AP MLD (MLD_S) may be a non-AP MLD 111. Although the AP MLD 101 is illustrated with two affiliated APs (AP1 and AP2) and the non-AP MLD 111 is illustrated as a non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

FIGS. 3 and 4 illustrate the scenario in which the TDLS discovery is initiated by a non-AP MLD (MLD_S). MLD_S has performed multi-link setup with an AP MLD (MLD_A). As noted above, MLD_S has two affiliated STAs—STA1 and STA2. STA3 is not capable of performing multi-link operation and is not affiliated with a non-AP MLD. MLD_A has two affiliated APs—AP1 and AP2—where AP1 operates on link 1 and AP2 operates on link 2. STA1 and STA3 operate on link 1 and are associated with AP1. STA2 operates on link 2 and is associated with AP2.

In the example, MLD_S initiates TDLS discovery by transmitting two TDLS Discovery Request frames (which are Data frames), as it does not know which link STA3 is operating on and whether STA3 is affiliated with an MLD or is a STA not affiliated with an MLD. The first TDLS Discovery Request frame, illustrated in FIG. 3, has the BSSID field in the Link Identifier element set to the BSSID of AP1 and the second TDLS Discovery Request frame, illustrated in FIG. 4, has this field set to the BSSID of AP2. Both the frames have their A3 (DA) set to the STA3 MAC address and the To DS subfield of the Frame Control field set to 1.

The TDLS Discovery Request frame can be transmitted over either link 1 (through STA1 as represented by a solid line) or link 2 (through STA2 as represented by a dotted line). When the TDLS Discovery Request frame is received at the AP MLD (i.e., through AP1 or AP2), it routes the frame to STA3 through AP1 by setting the From DS subfield of the Frame Control field to 1 and A3 (SA) to the non-AP MLD Address (i.e., MLD_S).

STA3 discards the TDLS Discovery Request frame that had the BSSID field of its Link Identifier element set to the BSSID of AP2, as it does not recognize the BSSID. STA3 recognizes the BSSID set to AP1 and responds with a TDLS Discovery Response frame, which is a Management frame, with the RA set to the MLD_S and both the To DS and From DS subfields set to 0. The TDLS STA affiliated with MLD_S receives the TDLS Discovery Response frame, which is sent on the TDLS direct link. The TDLS initiator STA Address field and the TDLS responder STA Address field contained in the Link Identifier element (denoted as LI in the figure) are carried in the TDLS Discovery Request frame and in the TDLS Discovery Response frame and are set to MLD_S and STA3, respectively.

Figure 5:
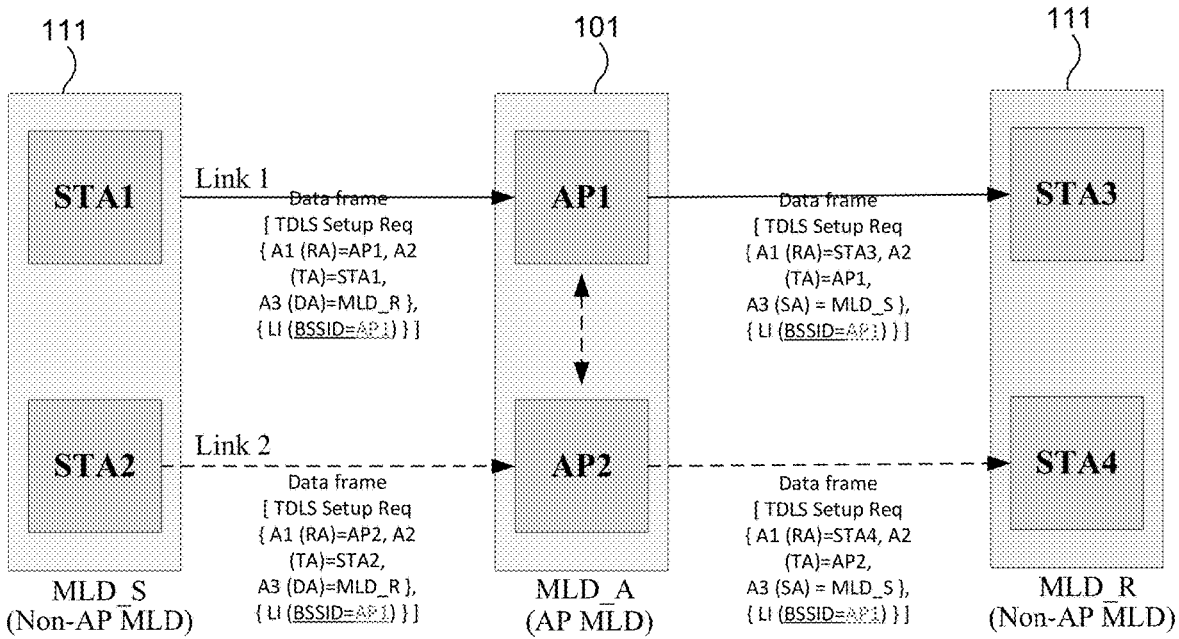
FIGS. 5 and 6 illustrate an example process for setting up a single TDLS direct link according to embodiments of the present disclosure.
Figure 6:
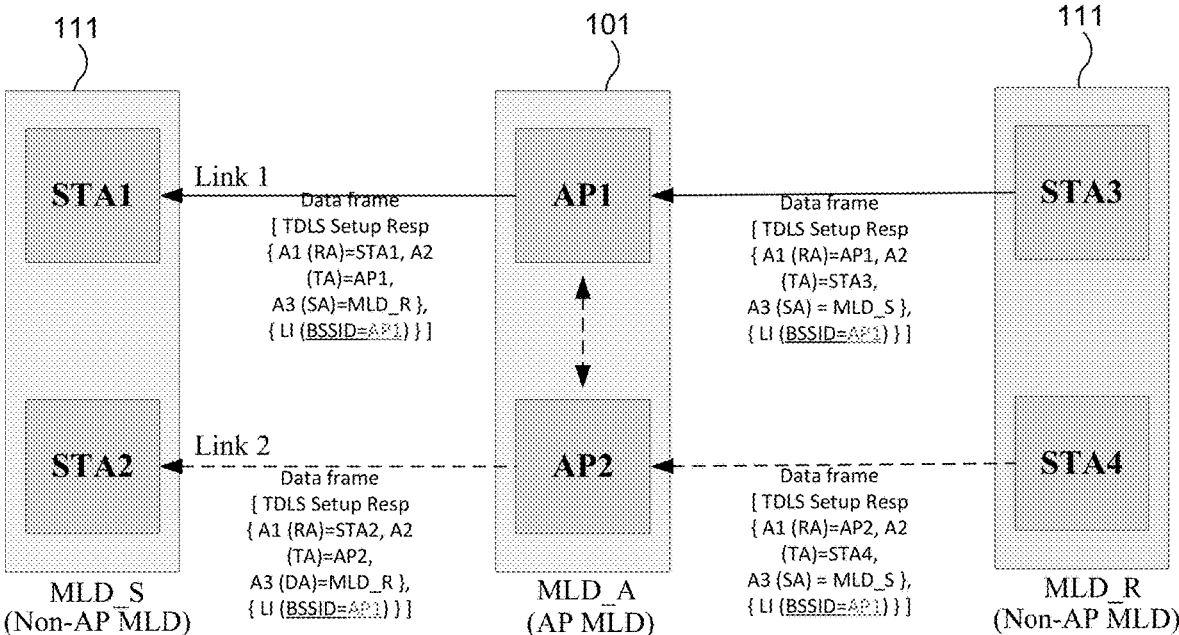

FIGS. 5 and 6 illustrate an example process for setting up a single TDLS direct link according to embodiments of the present disclosure. In this example, the AP MLD (MLD_A) may be an AP MLD 101, and the non-AP MLDs (MLD_S and MLD_R) may be non-AP MLDs 111. Although the AP MLD 101 is illustrated with two affiliated APs (AP1 and AP2) and the non-AP MLDs 111 are illustrated as non-AP MLDs with two affiliated non-AP STAs (STA1 and STA2, and STA3 and STA4), it is understood that this process could be applied with suitable MLDs having any number of affiliated APs or STAs.

FIGS. 5 and 6 illustrate the scenario in which a single link TDLS direct link is set up between two non-AP MLDs that have performed multi-link setup with the same AP MLD. MLD_S has two affiliated STAs—STA1 and STA2—and MLD_R has two affiliated STAs—STA3 and STA4. MLD_A has two affiliated APs—AP1 and AP2—where AP1 operates on link 1 and AP2 operates on link 2. STA1 and STA3 operate on link 1 and are associated with AP1. STA2 and STA4 operate on link 2 and are associated with AP2.

The example of FIGS. 5 and 6 assumes that the two non-AP MLDs have performed TDLS discovery and that the initiating non-AP MLD (in this example, MLD_S) has decided to perform a single link TDLS setup for link 1. As illustrated in the figures, the TDLS Setup Request frame is transmitted by the non-AP MLD, MLD_S, through its affiliated STA1 to MLD_R through its affiliated STA3. The BSSID field in the Link Identifier element identifies the intended link for establishing the TDLS direct link.

As noted above, there is currently no defined procedure for discovery and setup of multiple P2P direct links (e.g., TDLS direct links) between two non-AP MLDs. Various embodiments of the present disclosure herein below provide a framework and mechanism for enabling discovery and setup of multiple TDLS direct links between two non-AP MLDs, such as MLD_S and MLD_R of FIGS. 5 and 6.

According to one embodiment, when a non-AP MLD intends to establish multiple TDLS direct links with another non-AP MLD (i.e., a peer non-AP MLD), the non-AP MLD may first attempt to discover the STAs affiliated with the peer non-AP MLD operating on those multiple links.

Figure 7:
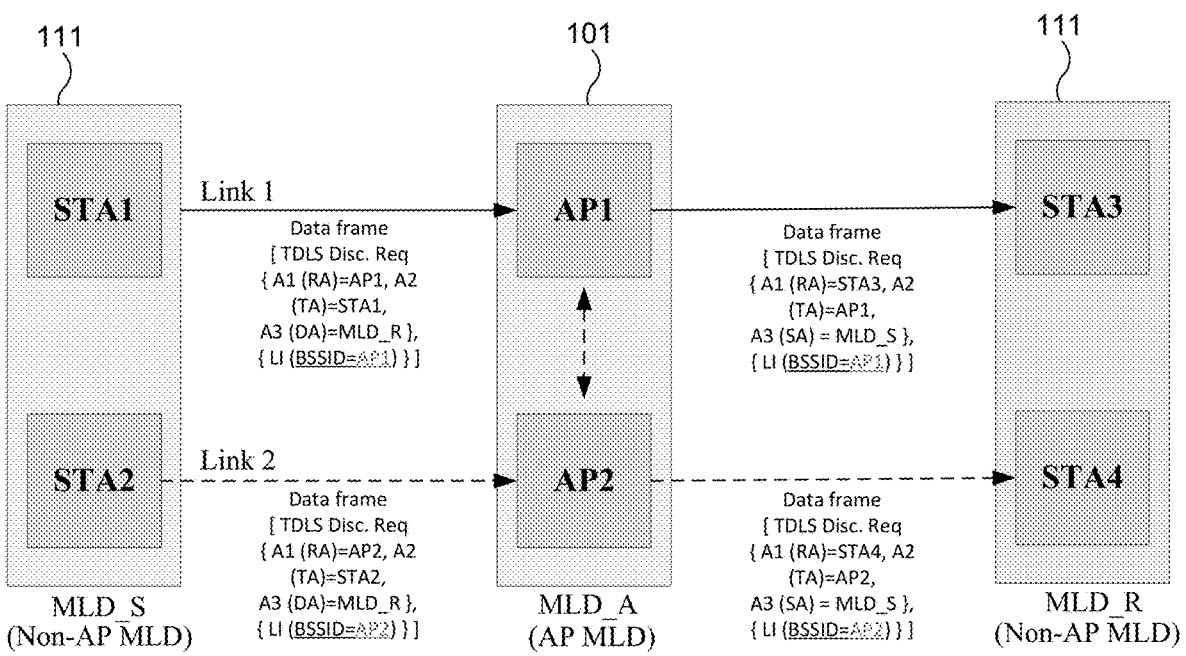
FIGS. 7 and 8 illustrate an example process for establishing multiple TDLS direct links using multiple TDLS Discovery Request frames according to embodiments of the present disclosure.
Figure 8:
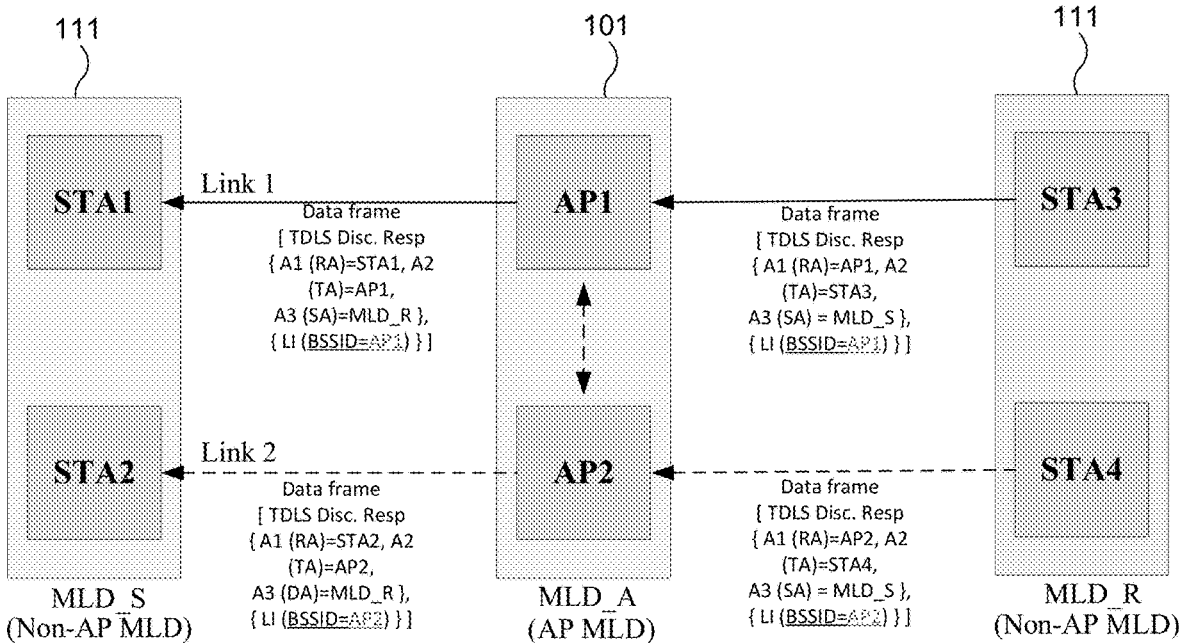

FIGS. 7 and 8 illustrate an example process for establishing multiple TDLS direct links using multiple TDLS Discovery Request frames according to embodiments of the present disclosure. According to one embodiment illustrated in FIG. 7, a first non-AP MLD that intends to establish multiple TDLS direct links with a second non-AP MLD may send multiple TDLS Discovery Request frames to the second non-AP MLD. Each TDLS Discovery Request frame may contain a Link ID indicating different APs corresponding to different links on which the first non-AP MLD intends to establish a TDLS direct link.

According to one embodiment illustrated in FIG. 8, a second non-AP MLD that receives multiple TDLS Discovery Request frames from a first non-AP MLD—each indicating different links (through the Link ID information of the TDLS Discovery Request frames) on which the first non-AP MLD operates—can send, in response, multiple TDLS Discovery Response frames—each corresponding to one link on which the first non-AP MLD operates.

According to one embodiment, in a scenario in which a non-AP MLD intends to establish multiple TDLS direct links on multiple links on which the non-AP MLD is operating, the non-AP, when acting as a TDLS initiator, can include a TDLS Multi-Link element in the TDLS Discovery Request frame and TDLS Setup Request frame that it transmits. The TDLS Multi-Link element included in the TDLS Discovery Request frame or the TDLS Setup Request frame can convey an indication of and information on the links on which the non-AP MLD intends to establish the TDLS direct links.

According to one such embodiment, the TDLS Discovery Request frame or TDLS Setup Request frame transmitted by a non-AP MLD can contain one or more Link Info fields. According to one embodiment, a non-AP MLD, as the TDLS initiator, can include multiple Link Info fields in the TDLS Multi-Link element that it includes in the TDLS Discovery Request frame or TDLS Setup Request frame when the non-AP MLD intends to establish multiple TDLS direct links on multiple of the links on which the non-AP MLD operates.

The Link Info field may contain link-specific indications and information related to links corresponding to multiple TDLS direct link establishment.

Figure 9:
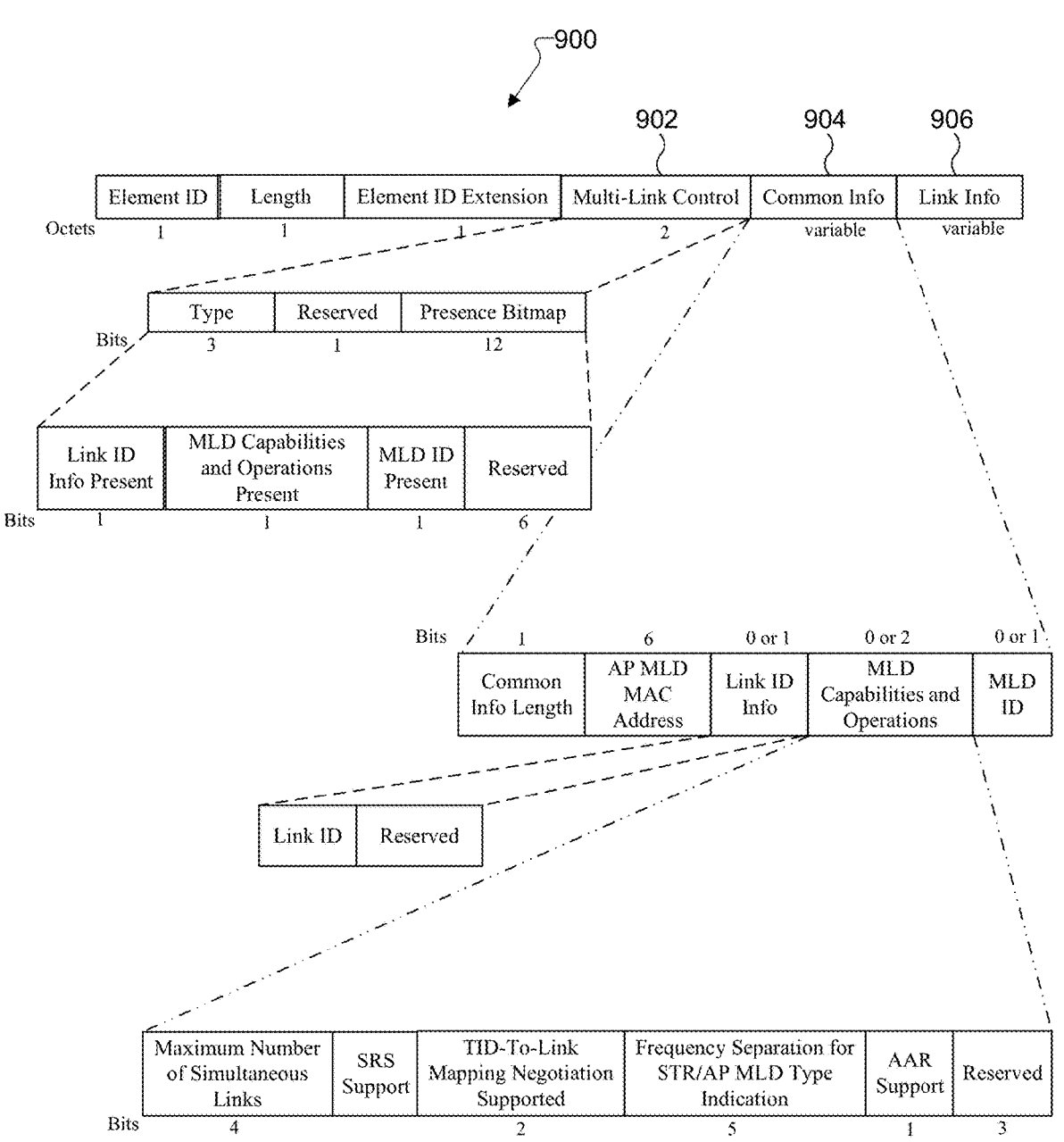
FIG. 9 illustrates an example format of a TDLS Multi-Link element according to embodiments of the present disclosure.

FIG. 9 illustrates an example format of a TDLS Multi-Link element 900 according to embodiments of the present disclosure. The example of FIG. 9 additionally illustrates example formats of the Multi-Link Control field 902 of the TDLS Multi-Link element and the Presence Bitmap subfield of the Multi-Link Control field 902, of the Common Info field 904 of the TDLS Multi-Link element and the Link ID Info and MLD Capabilities and Operations subfields of the Common Info field 904.

According to one embodiment, the Link ID subfield of the Common Info field 904 of the TDLS Multi-Link element may indicate the link ID of the link that transmits the frame containing the TDLS Multi-Link element 900.

According to one embodiment, the Link Info field 906 of the TDLS Multi-Link element 900 can contain zero or more Per-STA Profile sub-elements, each corresponding to different links on which the non-AP MLD operates.

According to one embodiment, when no Per-STA Profile is present in the Link Info field in a TDLS Multi-Link element, then the TDLS Discovery Request frame, TDLS Discovery Response frame, TDLS Setup Request frame, TDLS Setup Response frame, or TDLS Setup Confirm frame that contains the TDLS Multi-Link element can be for discovering, setting up, or confirmation of a single TDLS direct link. In this case, the intended link for which the frame is sent (either for discovering a TDLS peer STA on that link or setting up a TDLS direct link on that link or confirming setup of a TDLS direct link) can be determined by the Link Identifier element included in the corresponding frame.

According to one embodiment, when one or more Per-STA Profile sub-elements are present in the Link Info field of a TDLS Multi-Link element contained in a TDLS Discovery Request frame, the TDLS Discovery Request frame is sent by the TDLS initiator for discovering TDLS peer STAs on one or more of the links on which the non-AP MLD is operating.

Figure 10:
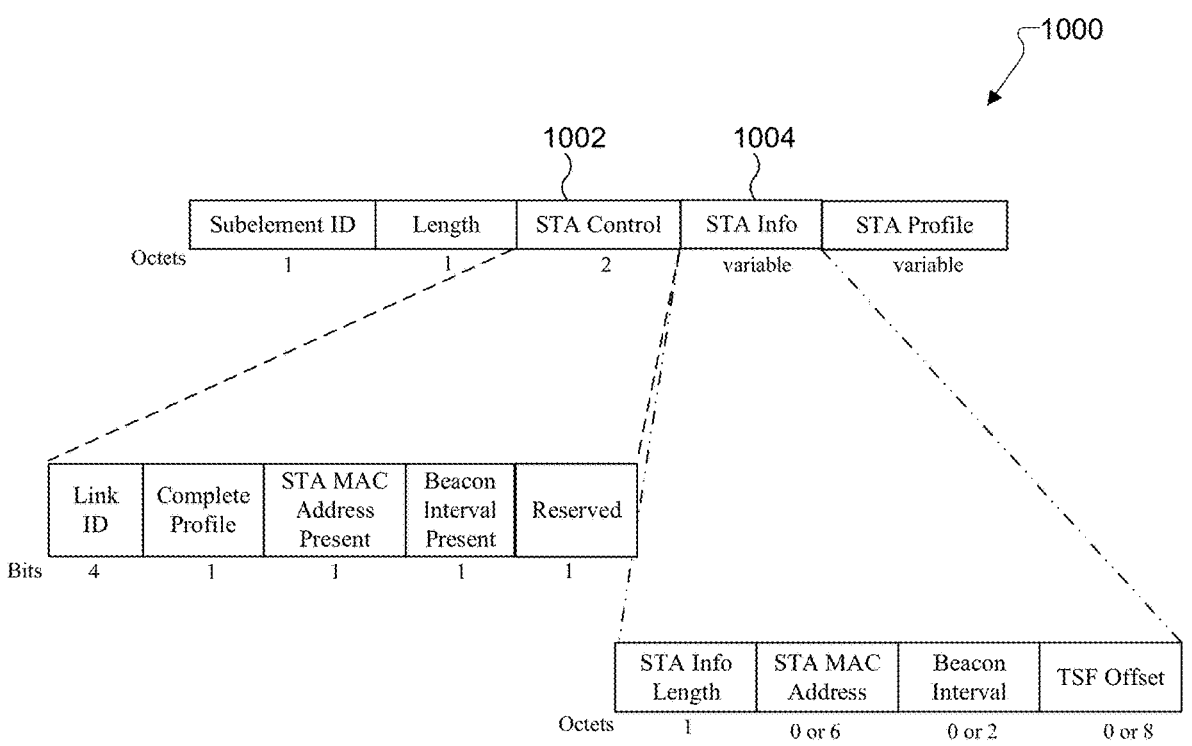
FIG. 10 illustrates an example format of a Per-STA Profile sub-element of the Link Info field of a TDLS Multi-Link element according to embodiments of the present disclosure.

FIG. 10 illustrates an example format of a Per-STA Profile sub-element 1000 of the Link Info field of a TDLS Multi-Link element according to embodiments of the present disclosure. In this example, the Per-STA Profile sub-element 1000 is a sub-element of the Link Info field 906 of the TDLS Multi-Link element 900. The Per-STA Profile sub-element 1000 can contain a STA Control field 1002 and a STA Info field 1004, example formats of which are shown in FIG. 10. Each Per-STA Profile sub-element can indicate and contain information related to different links on which the non-AP MLD intends to discover TDLS peer STAs. A Per-STA Profile sub-element of the Link Info field of the TDLS Multi-Link element can contain information such as that discussed herein below, but it is understood that this is only one example.

The STA Control field 1002 can contain different subfield presence indicators, such as an indication in the STA MAC Address Present subfield of whether the Medium Access Control (MAC) address of the STA affiliated with the non-AP MLD and operating on the link on which the TDLS discovery is intended is present. The STA Control field 1002 can also contain a Link Identifier in the Link ID subfield to identify the link on which TDLS discovery is intended, and an indication of whether the per-STA profile is a complete profile or not in the Complete Profile subfield (the definition of complete profile of a TDLS Multi-Link element can be similar to the definition of the complete profile of the Basic Multi-Link element).

The STA Info field 1004 can contain a STA Info Length subfield which indicates the length of the STA Info field 1004, and a STA MAC Address field which specifies the MAC address of the STA operating on the link on which the TDLS discovery is intended.

FIG. 11 illustrates an example process 1100 for Multiple TDLS discovery for a non-AP MLD. The example process 1100 uses the TDLS Multi-Link element for discovering TDLS peer STAs on multiple links.

The use of the TDLS Multi-Link element included in a TDLS Discovery Response frame as part of the TDLS discovery process on multiple links can be similar to the use of the TDLS Multi-Link element included in the TDLS Discovery Request frame for discovering multiple TDLS peer STAs across multiple links.

The use of the TDLS Multi-Link element included in a TDLS Setup Request frame as part of the TDLS setup request process on multiple links can be similar to the use of the TDLS Multi-Link element included in the TDLS Discovery Request frame for discovering multiple TDLS peer STAs across multiple links.

The use of the TDLS Multi-Link element included in a TDLS Setup Response frame as part of the TDLS setup response process on multiple links can be similar to the use of the TDLS Multi-Link element included in the TDLS Discovery Request frame for discovering multiple TDLS peer STAs across multiple links.

The use of the TDLS Multi-Link element included in a TDLS Setup Confirm frame as part of the TDLS setup confirmation process on multiple links can be similar to the use of the TDLS Multi-Link element included in the TDLS Discovery Request frame for discovering multiple TDLS peer STAs across multiple links.

Figure 12:
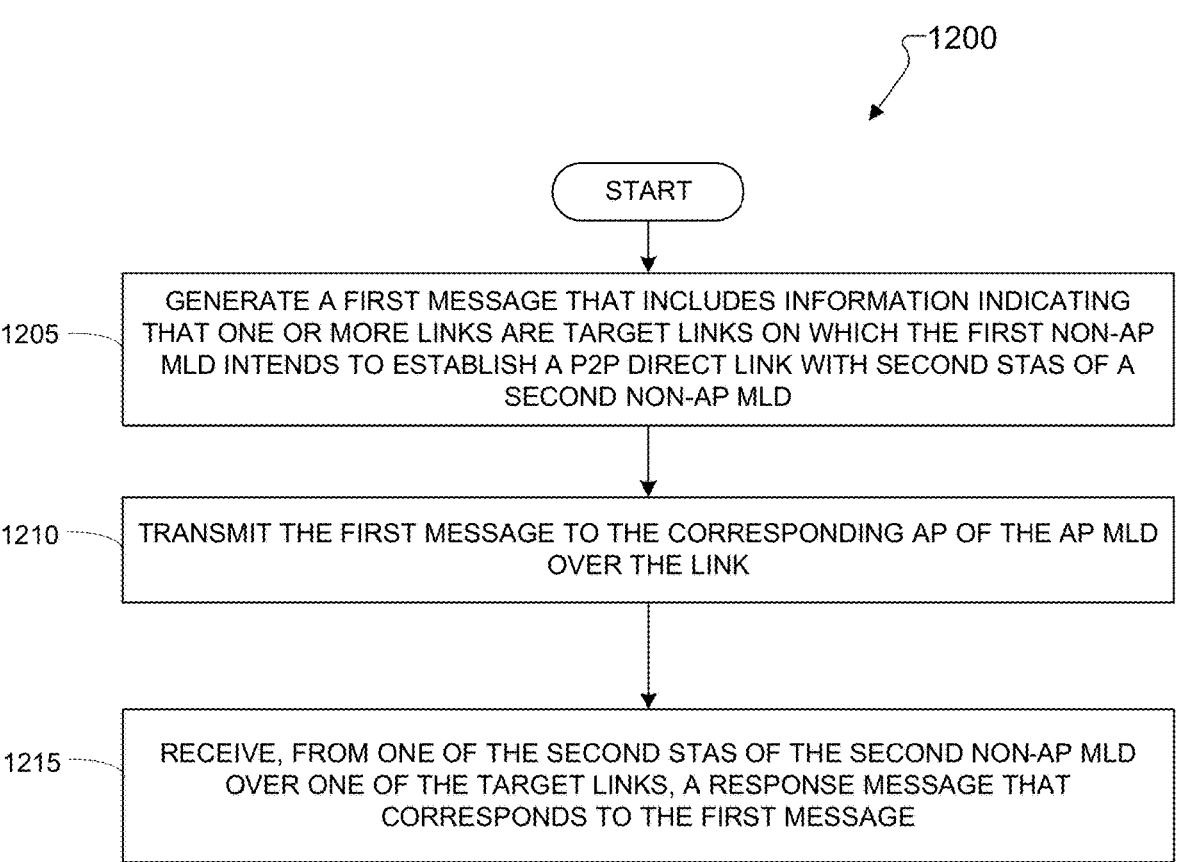
FIG. 12 illustrates an example process for facilitating the discovery and setup of multiple TDLS direct links for P2P communications between peer MLDs according to embodiments of the present disclosure.

FIG. 12 illustrates an example process 1200 for facilitating the discovery and setup of multiple TDLS direct links for P2P communications between peer MLDs according to embodiments of the present disclosure. The process 1200 is discussed as being performed by a first peer non-AP MLD, but it is understood that a corresponding second peer non-AP MLD performs a corresponding process. Additionally, for convenience the process 1200 is discussed as being performed by a WI-FI non-AP MLD comprising first STAs that each comprise a transceiver configured to form a link with a corresponding AP affiliated with a WI-FI AP MLD. However, it is understood that any suitable wireless communication device could perform these processes.

Referring to FIG. 12, the process 1200 begins with the first non-AP MLD generating a first message that includes information indicating that one or more of the links are target links on which the first non-AP MLD intends to establish a P2P direct link (e.g., a TDLS direct link) with second STAs of a second non-AP MLD, wherein the second STAs are associated with the corresponding AP of the AP MLD on the target links (step 1205). The information in the first message may indicate to the second non-AP MLD that the first non-AP MLD intends to establish the P2P direct links with the second STAs of the second non-AP MLD on one or more of the target links.

In some embodiments, the information in the first message is a multi-link element (e.g., a TDLS Multi-Link element) that includes link-specific information related to each of the target links. In some embodiments the multi-link element may include a link ID of one target link that indicates that the first non-AP MLD intends to establish a single P2P direct link on the one target link, where the one target link is different than the link on which the first message is transmitted.

In some embodiments the multi-link element may include per-STA profiles that correspond, respectively, to each of the target links. Each per-STA profile may include a link ID of the corresponding target link that indicates that the first non-AP MLD intends to establish a P2P direct link on the corresponding target link. Each per-STA profile may include a MAC address of the second STA that operates on the corresponding target link.

The first message may be one of a TDLS discovery request frame, a TDLS discovery response frame, a TDLS setup request frame, a TDLS setup response frame, or a TDLS setup confirm frame.

Next, the first non-AP MLD transmits the first message, via the transceiver of a first of the first STAs, to the corresponding AP of the AP MLD over the link between the first of the first STAs and the corresponding AP (step 1210).

Finally, the first non-AP MLD receives, from one of the second STAs of the second non-AP MLD over one of the target links, a response message that corresponds to the first message (step 1215). The response message may include the information on the target links.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first non-access point (AP) multi-link device (MLD), comprising:
  first stations (STAs) each comprising a transceiver configured to form a link with a corresponding AP of an AP MLD; and
  a processor operably coupled to the first STAs, the processor configured to generate a first message that includes information indicating that multiple of the links are target links on which the first non-AP MLD intends to establish a peer-to-peer (P2P) direct link with second STAs of a second non-AP MLD, wherein the second STAs are associated with the corresponding AP of the AP MLD on the target links, wherein the information includes a Link ID indicating different APs corresponding to different links on which the first non-AP MLD intends to establish a tunneled direct link setup (TDLS) direct link,
  wherein the transceiver of a first of the first STAs is further configured to transmit the first message to the corresponding AP of the AP MLD over the link.

2. The first non-AP MLD of claim 1, wherein the information in the first message is a multi-link element that includes link-specific information related to each of the target links.

3. The first non-AP MLD of claim 1, wherein:
  the information in the first message is a multi-link element that includes a link identifier (ID) of one target link that indicates that the first non-AP MLD intends to establish a single P2P direct link on the one target link, and
  the one target link is different than the link on which the first message is transmitted.

4. The first non-AP MLD of claim 1, wherein the information in the first message is a multi-link element that includes per-STA profiles that correspond, respectively, to each of the target links.

5. The first non-AP MLD of claim 4, wherein each per-STA profile includes a link ID of the corresponding target link that indicates that the first non-AP MLD intends to establish a P2P direct link on the corresponding target link.

6. The first non-AP MLD of claim 4, wherein each per-STA profile includes a medium access control (MAC) address of a second STA of the second STAs that operates on the corresponding target link.

7. The first non-AP MLD of claim 1, wherein the information in the first message indicates to the second non-AP MLD that the first non-AP MLD intends to establish the P2P direct link with the second STAs of the second non-AP MLD on the target links.

8. The first non-AP MLD of claim 1, wherein:
  the transceiver is further configured to receive, from one of the second STAs of the second non-AP MLD over one of the target links, a response message that corresponds to the first message, and
  the response message includes the information on the target links.

9. The first non-AP MLD of claim 1, wherein the first message is one of a tunneled direct link setup (TDLS) discovery request frame, a TDLS discovery response frame, a TDLS setup request frame, a TDLS setup response frame, or a TDLS setup confirm frame.

10. A method of wireless communication performed by a first non-access point (AP) multi-link device (MLD) that comprises first stations (STAs) that each comprise a transceiver configured to form a link with a corresponding AP of an AP MLD, the method comprising:
  generating a first message that includes information indicating that multiple of the links are target links on which the first non-AP MLD intends to establish a peer-to-peer (P2P) direct link with second STAs of a second non-AP MLD, wherein the second STAs are associated with the corresponding AP of the AP MLD on the target links, wherein the information includes a Link ID indicating different APs corresponding to different links on which the first non-AP MLD intends to establish a tunneled direct link setup (TDLS) direct link; and transmitting the first message to the corresponding AP of the AP MLD over the link.

11. The method of claim 10, wherein the information in the first message is a multi-link element that includes link-specific information related to each of the target links.

12. The method of claim 10, wherein:

the information in the first message is a multi-link element that includes a link identifier (ID) of one target link that indicates that the first non-AP MLD intends to establish a single P2P direct link on the one target link, and the one target link is different than the link on which the first message is transmitted.

13. The method of claim 10, wherein the information in the first message is a multi-link element that includes per-STA profiles that correspond, respectively, to each of the target links.

14. The method of claim 13, wherein each per-STA profile includes a link ID of the corresponding target link that indicates that the first non-AP MLD intends to establish a P2P direct link on the corresponding target link.

15. The method of claim 13, wherein each per-STA profile includes a medium access control (MAC) address of a second STA of the second STAs that operates on the corresponding target link.

16. The method of claim 10, wherein the information in the first message indicates to the second non-AP MLD that the first non-AP MLD intends to establish the P2P direct link with the second STAs of the second non-AP MLD on the target links.

17. The method of claim 10, further comprising receiving, from one of the second STAs of the second non-AP MLD over one of the target links, a response message that corresponds to the first message, wherein the response message includes the information on the target links.

18. The method of claim 10, wherein the first message is one of a tunneled direct link setup (TDLS) discovery request frame, a TDLS discovery response frame, a TDLS setup request frame, a TDLS setup response frame, or a TDLS setup confirm frame.

19. An access point (AP) multi-link device (MLD), comprising:

APs each comprising a transceiver configured to form a link with a corresponding first station (STA) of a first non-AP MLD and with a corresponding second STA of a second non-AP MLD; and a processor operably coupled to the APs, wherein the transceiver of a first of the APs is further configured to receive, from the corresponding first STA of the first non-AP MLD over the link, a first message that includes information indicating that multiple of the links are target links on which the first non-AP MLD intends to establish a peer-to-peer (P2P) direct link with second STAs of the second non-AP MLD that are associated with corresponding AP of the AP MLD on the target links, wherein the information includes a Link ID indicating different APs corresponding to different links on which the first non-AP MLD intends to establish a tunneled direct link setup (TDLS) direct link, wherein the processor is configured to determine that the first message is intended for the second non-AP MLD, and wherein the transceiver of the first of the APs is further configured to transmit the first message to the corresponding second STA of the second non-AP MLD over the link.

20. The AP MLD of claim 19, wherein the information in the first message is a multi-link element that includes link-specific information related to each of the target links.

\* \* \* \* \*